Oct. 12, 1965     J. D. CLEMENT ETAL     3,211,930
THERMIONIC ENERGY CONVERTER
Filed Nov. 8, 1962
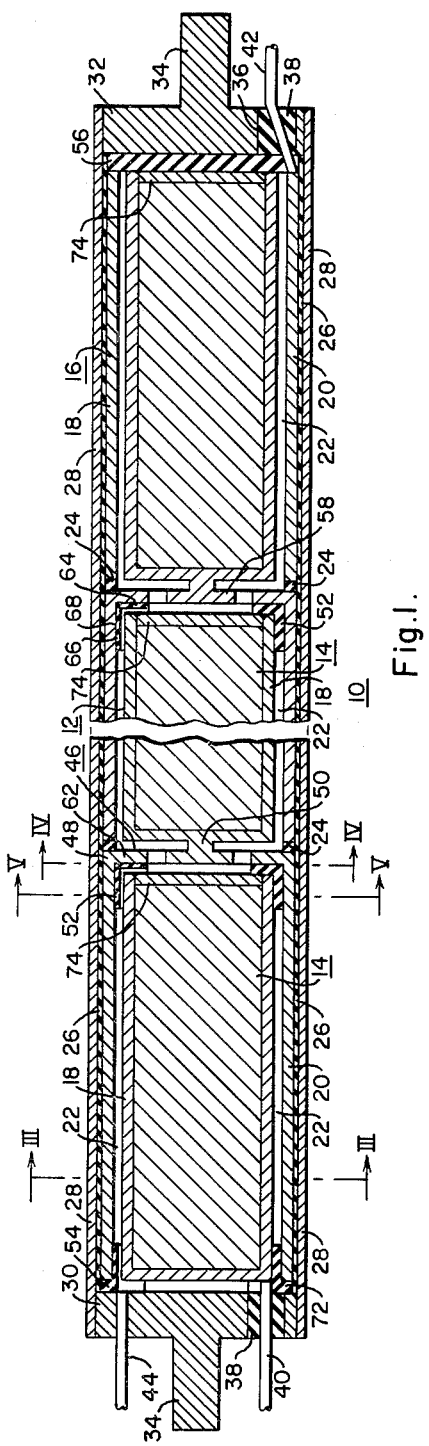
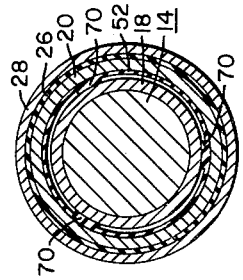
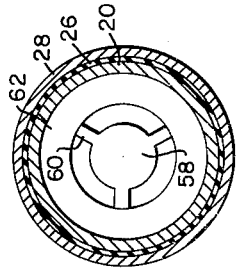
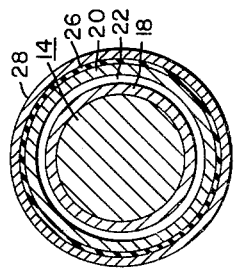
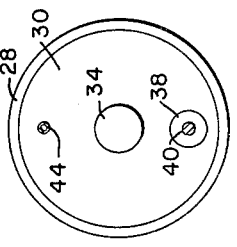
INVENTORS
Joseph D. Clement and
Robert R. Kirsch.
BY 
ATTORNEY

United States Patent Office 3,211,930
Patented Oct. 12, 1965

3,211,930
THERMIONIC ENERGY CONVERTER
Joseph D. Clement, Bethel Park, and Robert R. Kirsch, Irwin, Pa., assignors to Westinghouse Electric Corporation, Pittsburgh, Pa., a corporation of Pennsylvania
Filed Nov. 8, 1962, Ser. No. 236,276
7 Claims. (Cl. 310—4)

The present invention relates to thermionic energy converters and more particularly to thermionic nuclear fuel elements.

One manner in which direct energy conversion can be obtained from heat to electricty is through the use of the well known thermionic phenomena. In accordance with these phenomena, electrons subjected to energy in excess of the work function level are emitted into surrounding interelectrode space from the surface of a highly heated metallic and electron emissive body or from an emissive coating on such surface. In practice, a thermionic energy conversion device employs a heated emissive body as a cathode which is located in proximity to a cooled anode. The emitted and energized electrons are then transported from the cathode to the cooled anode to form an electric current and relatively good operational efficiency can be obtained if electron space charge and its accompanying restrictive electric gradient are minimized or eliminated altogether. Further, with some limitations, thermionic efficiency is also directly dependent upon the temperature differential between the cathode and the anode.

Electron space charge in the inter-electrode space can be minimized or eliminated for example through the injection of a vaporized alkali metal such as cesium in that space. If the pressure of the metal vapor is sufficient, the metal atoms are ionized positively through contact with the hot cathode surface and the resulting ions undergo movement to the device region with greatest negative or electron charge and thereby more or less neutralize the latter charge. The metal vapor also retards cathode evaporation. Additional information on thermionic energy converters and the reduction of electron space charge therein can be obtained by reference to U.S. Patent 2,980,819 issued to G. R. Feaster on July 1, 1958, entitled "Thermal Energy Converter" and assigned to the present assignee.

One notable consideration encountered in developing thermionic energy conversion devices or diodes for use as an electric generator is the fact that the voltage developed across the anode and cathode is usually relatively low, perhaps as low as 1 to 2 volts or less. To obtain higher generated voltages, it is therefore necessary to connect a plurality of thermionic diodes in series. A series system such as this can be obtained by connecting a plurality of separate thermionic devices together, but in many applications this is neither feasible nor efficient because of the nature of the source from which the thermionic cathodes are to be heated, and therefore a plurality of thermionic diodes are normally desirably incorporated in series circuit relation in a single thermionic energy conversion device.

Considering the case where a plurality of thermionic diodes are embodied in a single thermionic device for the reason just denoted, it is necessary that good cathode-anode mechanical support and accurate cathode-anode spacing be provided. Further, it is neessary that cathode-anode heat transfer be held at a relatively low value so as to enable efficient diode and device operation to be maintained at the desired anode-cathode temperature differential and simultaneously that electrically conductive connections be established between anodes and cathode of electrically successive diodes.

If the thermionic device is elongated, then it is convenient in many applications to have respective hollow cathodes of the plural thermionic diodes occupy successive but spaced longitudinal segments of the device and be otherwise located laterally inwardly of the device (or radially inwardly of the device if the device cross section is circular and if the cathodes are generally in the form of hollow cylinders). Respective longitudinally spaced hollow anodes of the thermionic diodes are then disposed outwardly of the cathodes and suitably electrically connected thereto so as to establish the series thermionic electrical circuit previously described. Cathode heating can then be provided by suitable means within the cathode hollow and anode cooling can be provided by suitable means outwardly of the anodes. In some applications, of course, it may be desirable to reverse the cathode-anode geometry, namely to dispose the cathode laterally outwardly of the anode and correspondingly to interchange the location of the heating and cooling means.

When nuclear fuel material is used as a heat source for a thermionic device, it is then usually preferable to locate the the thermionic cathodes within the anodes so that the nuclear fuel material may be concentrated within the cathodes and spaced from the reactor coolant so as to produce a relatively steep cathode-anode temperature gradient. The resulting arrangement is then described as a thermionic nuclear energy conversion (fuel) element and this element can be employed with other such elements (and if desired other conventional nuclear fuel elements) in forming an array of relatively stationary fuel elements in the reactive region of a nuclear reactor. Anode cooling is then provided by the selected reactor coolant (either gaseous or liquid) and suitable interconnections are made among the various thermionic nuclear fuel elements to provide an output of generated thermionic power. Additional power can be derived from the reactor coolant through the use of conventional thermodynamic machinery, or the like. A fissile isotope such as one or more of the fissionable isotopes U233, U235 and Pu239 can be incorporated within the fuel material and a chain reaction is propagated by neutrons during operation of the reactor in a manner now well known or ascertainable from prior patents or other published material. In a conventional reactor, as is the case for a thermionic nuclear reactor, the fuel elements usually are spaced relative to one another within the interior of the reactor so that a coolant fluid such as liquid metal, pressurized water, carbon dioxide, helium or an organic material, which is liquid at reactor operating temperatures can be circulated among the fuel elements. If the coolant is water or an organic material, it can also serve as the reactor moderator for slowing generated neutrons to themal or fission producing velocities. High diode operating temperature may require the use of liquid metal such as sodium or lithium in fast reactor applications.

The reactor can be controlled for example by movable reflectors or by the insertion of control rods or other material, containing neutron absorptive matter, into the reactor in order to maintain the chain reaction at a given power level by the absorption of excess neutrons. The operation of a nuclear reactor in more specific respects is widely understood in the nuclear art and accordingly will not be described in any greater detail here but will be considered subsequently only with respect to considerations of compatibility of a thermionic device with a nuclearly reactive environment. Additional general description of thermionic structure above or combined with nuclearly reactive structure and the operation thereof can be obtained by reference to Serial No. 158,736 filed on December 12, 1961, by Joseph C. Danko, et al entitled "Cascaded Thermionic Converter"; Serial No. 36,269, filed on June 15, 1960, by Joseph C. Danko, et al. entitled "Combined Thermionic Thermoelectric Converter"; and Serial No. 236,356 filed on November 8, 1962, by Alvin E. Fein, et al. entitled "Thermionic Energy Converter Device and Manufacturing Methods Therefor," all of which are assigned to the present assignee.

In accordance with the broad principles of the present invention, a thermionic energy conversion element comprises a hollow elongated electrode arrangement disposed within another hollow elongated electrode arrangement to provide interelectrode electron transport space therebetween. A heat source, or in some applicatons fissionable or nuclear fuel material, can be suitably disposed for heating one of the electrode arrangements and the other electrode arrangement can be subjected to cooling by a flowing coolant. Means are provided for supporting and accurately spacing the electrode arrangements and other structural components relative to each other so as to provide good mechanical strength for the thermionic energy conversion element yet so as to restrict the cathode-anode heat transfer rate to a value conducive to relatively efficient operation. Further, the electrode arrangements are so interconnected through at least a part of the supporting means as to form a series of thermionic diodes in a series power generating circuit, and leads or terminals can be employed for extracting generated electric power. The thermionic energy conversion element can be suitably clad to seal the inter-electrode space and, if used, to seal the nuclear fuel material from the coolant.

Thus, it is an object of the invention to provide a novel and efficient thermionic energy conversion element having a plurality of series-connected thermionic diodes wherein cathode-anode heat transfer is relatively minimized.

It is another object of the invention to provide a novel and efficient thermionic energy conversion element as described in the first object, wherein good mechanical support is simultaneously provided for all the structural components of the thermionic energy conversion element.

A further object of the invention is to provide a novel and efficient thermionic energy conversion element as described in the first two objects, wherein respective cathodes of a cathode arrangement are elongated and in end-to-end relation and disposed within respective elongated anodes.

An additional object of the invention is to provide a novel and efficient thermionic energy conversion element as described in the first three objects, wherein anode-cathode support is provided by means including laterally extending conductive means conductively engaging electrically successive anodes and cathodes of longitudinally adjacent diodes and being of optimum cross section for relatively minimum heat transfer and relatively maximum electron conduction.

An additional object of the invention is to provide a novel and efficient thermionic energy conversion element as described in the preceding object, wherein the anode-cathode support means also include insulative supporting members engaging opposed cathodes and anodes with limited heat transfer area therebetween.

It is another object of the invention to provide a novel and efficient thermionic energy conversion element as described in any of the first three objects, wherein fissile material or nuclear fuel acts as a heat source and is disposed within the cathode arrangement.

These and other objects of the invention will become more apparent upon consideration of the following detailed description along with the attached drawings, in which:

FIGURE 1 shows a longitudinal section of a thermionic energy conversion element having portions thereof broken away and constructed in accordance with the principles of the invention;

FIG. 2 shows an end view of the element of FIG. 1;

FIG. 3 shows a cross section taken along the reference line III—III of FIG. 1;

FIG. 4 shows a cross section taken along the reference line IV—IV of FIG. 1; and FIG. 5 shows a cross section taken along the reference line V—V of FIG. 1.

There is shown in FIG. 1 an elongated thermionic energy conversion device or element 10 comprising in this case an elongated cathode arrangement 12 disposed laterally inwardly of the thermionic energy conversion element 10 for heat delivery from a centrally located heat source 14. The thermionic energy conversion element 10 further comprises an elongated anode arrangment 16 disposed laterally outwardly of the cathode arrangement 12 for collection of electrons emitted by the latter. As already noted, however, in some cases it may be desirable to reverse this cathode-anode geometry.

The cathode arrangement 12 includes a plurality of elongated tubular cathode members 18 (exemplary wall thickness of 10 to 30 mils) disposed in end-to-end relation. Similarly, the anode arrangement 16 includes a plurality of elongated tubular anode members 20 (exemplary wall thickness of 30 mils) disposed in end-to-end relation and further in concentric inward facing relation to the cathode members 18, respectively. Accordingly, an annular inter-electrode space 22 (exemplary radial dimension of 20 mils) is formed between radially opposed but slightly longitudinally offset cathode and anode members 18 and 20 for transport of cathode emitted electrons to the respectively associated anode members 20.

The anode members 20 are respectively spaced or divided by suitably formed annular insulative or ceramic members 24 and further disposed within an elongated tubular electrically insulative or ceramic layer (exemplary thickness of 5 mils). The insulative or ceramic material used for the members 24 and the layer 26 preferably is both highly electrically resistive and highly thermally conductive so as electrically to insulate the anode members 20 from each other and from the exterior while providing good cooling therefor. Examples of such materials are beryllia (BeO) and alumina ($Al_2O_3$). Any suitable means can be used for forming and disposing the layer 26 about the anode members 20, for example by plasma spraying.

An elongated tubular outer cladding member 28 (exemplary outer diameter of 530 mils) is disposed over the tubular insulative layer 26 and respective end plugs 30 and 32 are secured to the cladding member 28 for sealing purposes by any suitable means such as by welding. The material used for the cladding member 28 and the end plugs 30 and 32 is preferably chemically compatible with the selected anode coolant and further is sufficiently refractory to withstand the anode operating temperature (as high as 700° C.). Examples of acceptable materials are stainless steel, niobium alloys or molybdenum alloys. The cladding member 28 can be disposed over the insulative layer 26 by any suitable method such as by sliding the former over the latter and following this step by compaction or swaging to obtain good bonding.

Each end plug 30 or 32 is provided with a stud 34 which can be used for placement of the thermionic energy conversion element 10 in a reactor core assembly (not shown) in any well known manner such as by securance of a bolt (not shown) to each stud 34. Further, each end plug 30 or 32 is provided with an opening 36 in which an insulative or ceramic bushing 38 is firmly and hermetically secured by means of a ceramic to metal sealing material or by any other suitable means. Cathode connection means are provided in the form of a cathode power conductor or lead 40, which is hermetically extended through the washer 38 of the end plug 30 and anode connection means are provided in the form of an anode conductor or lead 42 which is hermetically extended through the washer 38 of the end plug 32. In addition, a conduit or pinch-tube 44 is suitably extended through the end plug 30 for the purposes of evacuation and of injecting the vapor of an alkali metal such as cesium into the inter-electrode spaces 22 from a suitably located and temperature controlled cesium container (not shown). The operating purpose of this vapor has already been considered.

Support means are provided for retaining the cathode and anode members 18 and 20 in concentric relation with accurate spacing therebetween under expected operating conditions. Radially opposed but slightly longitudinally offset anode and cathode members 20 and 18 form respective thermionic diodes or cells and the anode 20 of each cell is electrically connected in series with the cathode 18 of the next longitudinally adjacent cell. The support means comprise electrically conductive means 46 connecting an end region 48 of each serially connected anode 20 to an end cathode region 50 of the adjacent serially connected cell, and further comprise a plurality of cathode-anode spacers 52 and 54 formed from insulative or ceramic material, such as beryllia or alumina. An end ceramic spacer 56 insulates the end plug 32 from the anode member 20 and the cathode member 18 and provides support for the latter two members which are located in abutting relation thereto.

Consideration has already been given to the fact that efficient thermionic performance requires relatively low heat transfer from the cathode arrangement 12 to the anode arrangement 16 simultaneously with good mechanical electrode support and spacing (or centering) and with the establishment of a series electric generating circuit through the cathode and anode members 18 and 20 (or the thermionic cells or diodes to which reference has been made previously). Accordingly, the conductive means 46 include a base member or disc 58 on each cathode member 18 and a plurality of radially projecting and circumferentially spaced (preferably equally for cathode centering) members or spokes 60 (FIG. 4) which are disposed radially outward of each cathode disc 58 and which engage the end anode region 48 of the longitudinally adjacent thermionic cell.

More particularly, the projecting members or spokes 60 engage a radially inwardly projecting end flange 62 of the anode end region 48 of the longitudinally adjacent cell and are at least three in number and in this case are integral with the associated cathode base member or disc 58. Thus, part of the required cathode support is provided by the members or spokes 60, that is the disc end of each cathode member 18 is supported in prescribed relation to the anode arrangement 16. Simultaneously, the members or spokes 60 provide relatively good current conduction and only a limited cross sectional area for heat transfer from the interconnected cathodes 18 and anodes 20. For the same reasons, a rod-like or stud connection 61 between the cathode end disc 58 and the cathode proper (in the arrangement shown) is made relatively small in cross-sectional area. The optimum cross sectional area and length to be provided for the connection 61 and for the associated members or spokes 60 is determined on a balancing basis since the Joule loss due to electric current conduction varies inversely as area and directly as length whereas thermal loss due to heat conduction varies directly as area and inversely as length.

The ceramic spacers 52 and 54 are generally ring like in form and serve as another substantial part of the cathode supporting means. Thus, the spacers 52 have a ring portion 64 and an annular flange portion 66 engaging the adjacent anode flange 62 and an inner anode surface portion 68 respectively. At least three circumferentially spaced (preferably equally for cathode centering) fingers 70 extend inwardly from the spacer ring portion 64 and the spacer flange portion 66 to engage adjacent portions of the outer surface of the associated cathode member 18. The insulative fingers 70 are limited in cross section to limit the amount of heat transfer from the cathodes 18 to the anodes 20. Further, the spacer 54 is provided with a special design because of its end location and differs from the spacers 52 only in the provision of an outer ring portion 72 which is located longitudinally between the adjacent anode 20 and the end plug 30. It is clear therefore that the ceramic spacers 52 and 54 and the ceramic disc 56 (previously described) cooperate with the conductive means 46 in supporting the cathode arrangement 12 relative to the anode arrangement 14.

The heat source 14 is disposed within the cathode arrangement 12 and in this case is provided within each cathode member 18 as is especially feasible if, as in the present embodiment, fissile of fissionable material or nuclear fuel is employed as the heat source 14. By fissile, it is meant that the material is either "fertile" or fissionable and by "fertile" it is meant that the material is susceptible to transformation into a fissionable material by means of neutron flux. The nuclear fuel material can be provided in the form of pellets of uranium dioxide if desired, and such pellets can be conformed in size to the inner diameter of the respective cathode members 18 or located within respective refractory cladding members (not shown) which in turn can be insulatively disposed within the respective cathode members 18. For an arrangement similar to the latter one, referernce is made to Serial Number 236,356, filed by Alvin E. Fein et al. on November 8, 1962, entitled "Thermionic Energy Converter and Manufacturing Methods Therefor," and assigned to the present assignee. After insertion of the fuel pellets in the cathode members 18, respective end plugs 74 can be secured, as by welding, to the cathode members 14 to seal the nuclear fuel therein.

In operation, heat from the source 14 drives the cathode members 18 to a temperature of 2000° C. or higher and therefore it is preferred that the cathode material be highly refractory as well as electron emissive. Thus, cesium-coated tungsten, rhenium, tantalum and niobium are examples of suitable cathode materials. Further, when the heat source 14 is nuclear, the neutron absorptive property of the cathode and other structural materials are preferably relatively low. Beryllia is a good ceramic material on this basis, and tungsten, molybdenum and stainless steel are relatively good materials on this basis for the cathode members 18, the anode members 20 and the cladding member 28, respectively.

Electrically, the thermionic energy conversion device 10 includes a plurality (five shown exemplarily) of thermionic diodes (or cells) connected in electrical series. Heat produced by the heat source 14 or by fissionable material forming the heat source 14 is conducted to the various cathode members 18 so as to induce electron emission therefrom. Cooling is provided outwardly of the cladding member 28 and therefore a relatively high temperature gradient appears across the respective cathode members 18 and anode members 20 of the various diodes so as to provide for electron transport across the respective inter-electrode spaces 22 from the cathode members 18 to the respectively associated anode members 20. Further, the use of cesium or other alkali metal vapor reduces the electron space charge in the respective inter-electrode spaces 22 so as to enhance this electron transport process. Since the thermionic diodes are series-connected in the manner previously described, the generated voltages of the diodes are additive, that is the voltage produced in the left-most thermionic diode adds to the voltage produced in the thermionic diode located in the position second from the left, and so forth. The thermionic energy conversion element 10, of course, can be employed with other such elements or with other conventional nuclear fuel elements to form the reactive region of a nuclear reactor and suitable connections can then be made with the power leads 40 and 42 so as to provide for external delivery of generated thermionic power.

The foregoing description has been set forth only for the purpose of illustrating the invention. Accordingly, it is desired that the invention be not limited by the embodiment described, but, rather that it be accorded an interpretation consistent with the scope and spirit of its broad principles.

What is claimed is:

1. A thermionic energy conversion element comprising an elongated tubular electron emissive heatable cathode arrangement and an elongated tubular coolable anode arrangement spaced substantially concentrically from said cathode arrangement, said cathode and anode arrangements each having a plurality of respective radially opposed and longitudinally extending and spaced members, the radially opposed anode and cathode members forming respective thermionic diodes, means for connecting said diodes in electrical series and for supporting said cathode and anode arrangements relative to each other and relative to a cladding envelope therefor, said connecting and supporting means including a plurality of spaced and electrically conductive support members extending between and engaging an electrically conductive base member mounted on an end region of each cathode member except one of the end cathode members and an end region of the anode member of the longitudinally adjacent diode, said base members each being spacedly secured to the end region of its associated cathode member by an electrically conductive stud connection, the total electrically conducting structural cross section and the structural lengths of said support members and of said stud connections being so valued as to provide a relative minimum of cathode-anode heat transfer and a relative maximum of anode-cathode electron flow through said support members.

2. A thermionic energy conversion element comprising an elongated tubular electron emissive cathode arrangement and an elongated tubular anode arrangement spaced substantially concentrically from said cathode arrangement, means for enabling said cathode arrangement to be heated and for enabling said anode arrangement to be cooled, said cathode and anode arrangements having a plurality of respective radially opposed and longitudinally extending and spaced members, the radially opposed anode and cathode members forming respective thermionic diodes, means for connecting said diodes in electrical series and for supporting said cathode and anode arrangements relative to each other and relative to a cladding envelope therefor, said connecting and supporting means including a plurality of spaced and electrically conductive support members extending between and engaging an electrically conductive base member mounted on a first end region of each cathode member except one of the end cathode members and an end region of the anode member of the longitudinally adjacent diode, said base members each being spacedly secured to the first end region of its associated cathode member by an electrically conductive stud connection, the total electrically conducting structural cross section and the structural lengths of said support members and of said stud connections being so valued as to provide a relative minimum of cathode-anode heat transfer and a relative maximum of anode-cathode electron flow through said support members, and said connecting and supporting means also including respective ceramic rings engaging each other end region of each cathode member and engaging another end region of the opposed anode member.

3. A thermionic energy conversion element comprising an elongated tubular electron emissive cathode arrangement and an elongated tubular anode arrangement spaced concentrically from said cathode arrangement, means for enabling said cathode arrangement to be heated and for enabling said anode arrangement to be cooled, said cathode and anode arrangements having a plurality of respective radially opposed and longitudinally extending and spaced members, the radially opposed anode and cathode members forming respective thermionic diodes, means for connecting said diodes in electrical series and for supporting said cathode and anode arrangements relative to each other and relative to a cladding envelope therefor, said connecting and supporting means including a plurality of spaced and electrically conductive support members extending between and engaging an electrically conductive base member mounted on an end region of each cathode member except one of the end cathode members and an end region of the anode member of the longitudinally adjacent diode, said base member each being spacedly secured to the end region of its associated cathode member by an electrically conductive stud connection, the total electrically conducting structural cross section and the structural of said stud connections and lengths of said support members being so valued as to provide a relative minimum of cathode-anode heat transfer and a relative maximum of anode-cathode electron flow through said support members, and said connecting and supporting means also including respective ceramic rings engaging each other cathode end region and engaging another end region of the opposed anode member, at least some of said ceramic rings having a plurality of spaced radially extending fingers establishing the described cathode engagement so as to limit cathode-anode heat transfer through said rings.

4. The combination of claim 1 wherein the described element thereof is further characterized as a thermionic nuclear fuel element and wherein fissionable material is sealed as a heat source in juxtaposed relation to each of said cathode members and respective cathode and anode electrical connection means are provided.

5. The combination of claim 1 wherein the described element thereof is further characterized as a thermionic nuclear fuel element and wherein said cathode arrangement is disposed within said anode arrangement and fissionable material is sealed as a heat source within each of said cathode members, an elongated electrically insulative and thermally conductive layer is disposed on said anode arrangement and an exterior cladding layer in turn is disposed on said insulative layer, end plugs are secured to said cladding layer so as to seal said fuel element from the exterior, and anode and cathode electrical leads extend through said end plugs, respectively.

6. The combination of claim 3 wherein the described element thereof is further characterized as a thermionic nuclear fuel element as set and wherein said cathode arrangement is disposed within said anode arrangement and fissionable material is sealed as a heat source within each of said cathode members, an elongated tubular electrically insulative and thermally conductive layer surrounds said anode arrangement and an exterior cladding layer in turn surrounds said insulative layer, end plugs are secured to said cladding layer so as to seal said fuel element from the exterior and anode and cathode electrical leads extending through said end plugs, respectively, and a conduit is extended through one of said end plugs for injection of an alkali metal vapor into the interelectrode spaces between said cathode and anode arrangements, said spaces communicating with one another between said fingers and between said support members.

7. A thermionic energy conversion element as set forth in claim 1, wherein said cathode arrangement is disposed within said anode arrangement, the base support member of each cathode member is an end disc mounted on the associated stud connection of the cathode member substantially concentrically thereof, and said support members are spaced circumferentially and extend radially outwardly to engage a radially inwardly extending end flange of the anode member of the longitudinally adjacent diode.

(References on following page)

References Cited by the Examiner

UNITED STATES PATENTS

| | | | |
|---|---|---|---|
| 2,980,819 | 4/61 | Feaster. | |
| 3,021,472 | 2/62 | Hernquist | 310—3 |
| 3,054,914 | 9/62 | Hatsopoulas et al. | 310—4 |
| 3,113,091 | 12/63 | Rasor et al. | 310—4 |
| 3,176,165 | 3/65 | Lawrence | 310—4 |

FOREIGN PATENTS 797,872   7/58   Great Britain.

OTHER REFERENCES

Nuclear Science and Engineering: vol. 10, No. 2, June 1961, pp. 173–182.

CARL D. QUARFORTH, *Primary Examiner*.
REUBEN EPSTEIN, *Examiner*.